United States Patent
Kung et al.

(10) Patent No.: US 7,906,939 B2
(45) Date of Patent: Mar. 15, 2011

(54) SOFT-STOP CIRCUIT AND METHOD FOR A VOLTAGE REGULATOR

(75) Inventors: Nien-Hui Kung, Hsinchu (TW); Kwan-Jen Chu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 452 days.

(21) Appl. No.: 12/071,729

(22) Filed: Feb. 26, 2008

(65) Prior Publication Data
US 2008/0211465 A1    Sep. 4, 2008

(30) Foreign Application Priority Data
Mar. 2, 2007   (TW) ............................... 96107198 A (51) Int. Cl.
*H02J 7/00* (2006.01)
*G05F 1/00* (2006.01)

(52) U.S. Cl. ......... 320/128; 320/137; 323/222; 323/282

(58) Field of Classification Search .................. 320/128, 320/137; 323/222
See application file for complete search history.

(56) References Cited

U.S. PATENT DOCUMENTS

| | | | |
|---|---|---|---|
| 6,351,110 B1* | 2/2002 | Pappalardo et al. | 323/285 |
| 7,180,272 B2* | 2/2007 | Okahara et al. | 322/37 |
| 7,411,379 B2* | 8/2008 | Chu et al. | 323/284 |
| 7,612,543 B2* | 11/2009 | Yu et al. | 323/222 |

* cited by examiner

*Primary Examiner* — Edward Tso
*Assistant Examiner* — M'Baye Diao
(74) *Attorney, Agent, or Firm* — Rosenberg, Klein & Lee (57) ABSTRACT

A soft-stop circuit and method are provided for a voltage regulator which converts a battery voltage to an output voltage according to a feedback voltage derived from the output voltage and a reference voltage, to control the voltage regulator to enter a soft-stop state when the battery voltage is lower than a threshold level, and in which state, and the output voltage is controlled to decrease so as for the battery voltage to have a slower decreasing speed and in turn a longer battery lifetime.

8 Claims, 10 Drawing Sheets

SOFT-STOP CIRCUIT AND METHOD FOR A VOLTAGE REGULATOR

FIELD OF THE INVENTION

The present is related generally to voltage regulators and, more particularly, to a soft-stop circuit and method for a voltage regulator.

BACKGROUND OF THE INVENTION

With the progress of technology, electronic products demand more and more from power supplies and therefore voltage regulators have attracted more and more attention. Conventional voltage regulators comprise switching regulators and low dropout (LDO) regulators, both functioning for converting input voltages to stable output voltages. However, in some certain situations, such voltage regulators may generate huge currents to damage components thereof or in their load circuits and thus an over current protection (OCP) mechanism is employed to prevent the voltage regulators from outputting excessive currents. Many prior arts, for example U.S. Pat. No. 6,091,610 to Garcia et al., have been proposed with OCP methods.

Figure 1:
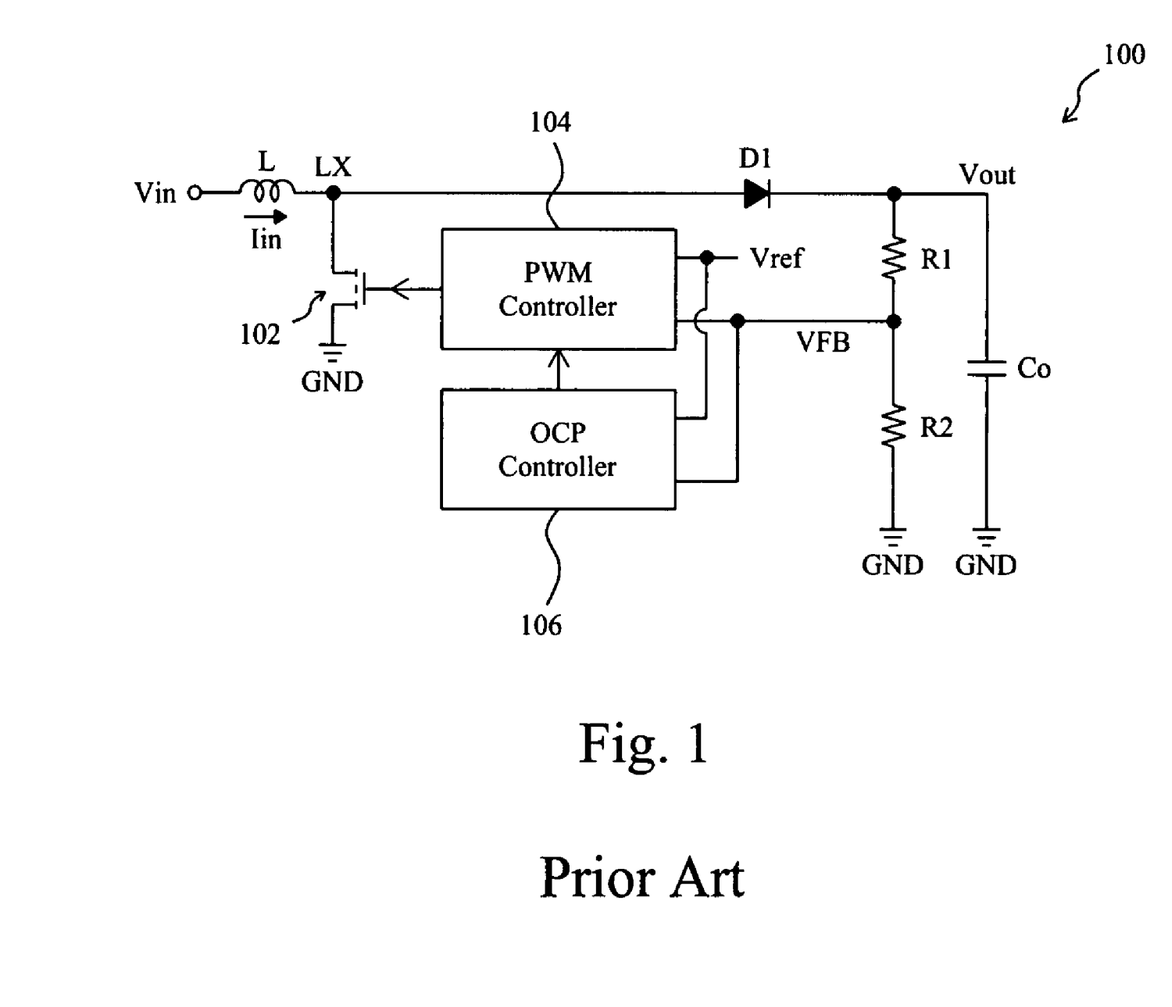
FIG. 1 shows a conventional boost switching regulator.

FIG. 1 is a simplified circuit diagram of a conventional boost switching regulator 100, in which an inductor L and a diode D1 are serially connected between a power input receiving an input voltage Vin and a power output providing an output voltage Vout, a switch 102 is connected between a switch node LX and ground GND, a pulse width modulation (PWM) controller 104 provides a PWM signal to switch the switch 102 so as to convert the input voltage Vin to the output voltage Vout, voltage divider resistors R1 and R2 are serially connected between the power output Vout and ground GND for dividing the output voltage Vout to generate a feedback voltage VFB, the PWM controller 104 determines a duty cycle of the switch 102 according to the feedback voltage VFB and a reference voltage Vref, and an OCP controller 106 monitors the input current Iin flowing through the inductor L by monitoring the feedback voltage VFB and the reference voltage Vref. When the inductor current Iin increases to reach a threshold level, the OCP controller 106 triggers an OCP signal to the PWM controller 104 so as to alter the duty cycle of the switch 102 and thereby restrict the inductor current Iin below the threshold level.

Figure 2:
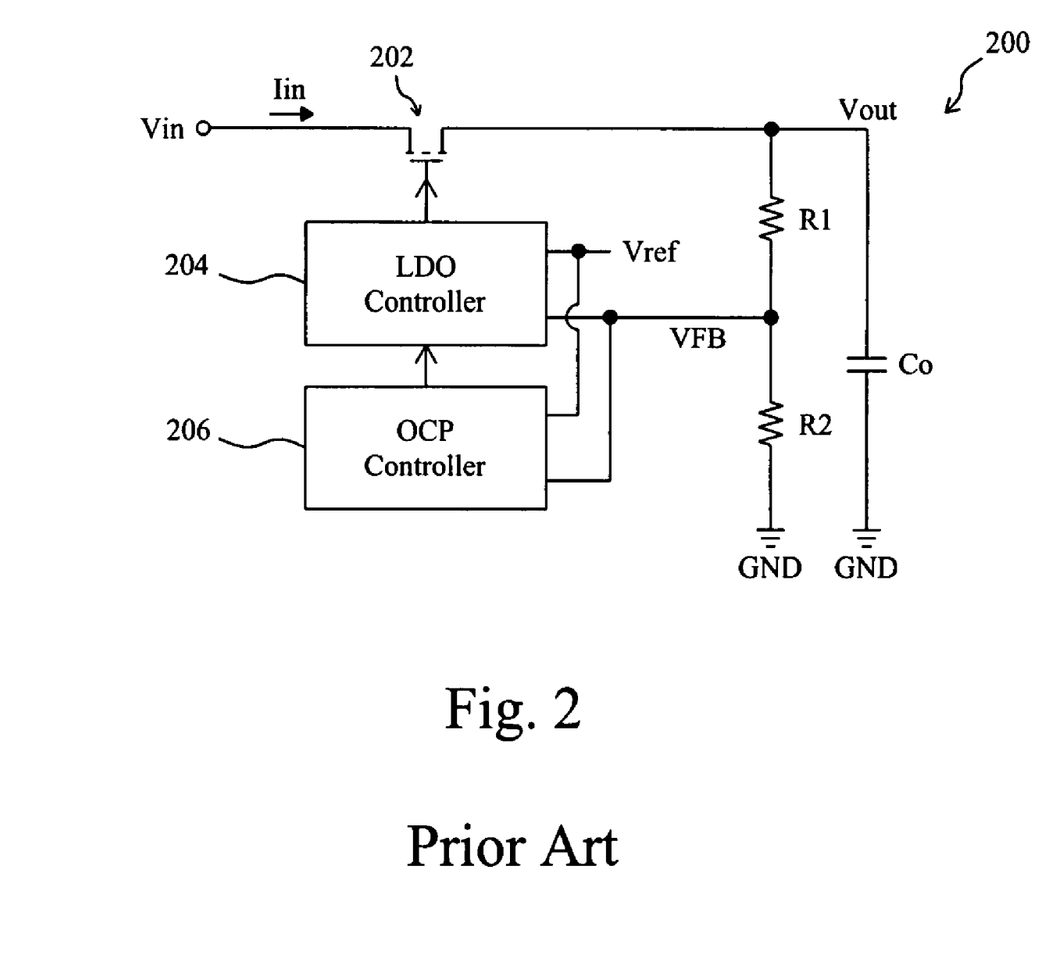
FIG. 2 shows a conventional LDO regulator.

FIG. 2 is a simplified circuit diagram of a conventional LDO regulator 200, in which a switch 202 is connected between a power input receiving an input voltage Vin and a power output providing an output voltage Vout, voltage divider resistors R1 and R2 are serially connected between the power output Vout and ground GND for dividing the output voltage Vout to generate a feedback voltage VFB, an LDO controller 204 determines the input current Iin flowing through the switch 202 according to the feedback voltage VFB and a reference voltage Vref, and an OCP controller 206 monitors the input current Iin by monitoring the feedback voltage VFB and the reference voltage Vref. When the input current Iin increases to reach a threshold level, the OCP controller 206 triggers an OCP signal to the LDO controller 204 to restrict the input current Iin.

Figure 3:
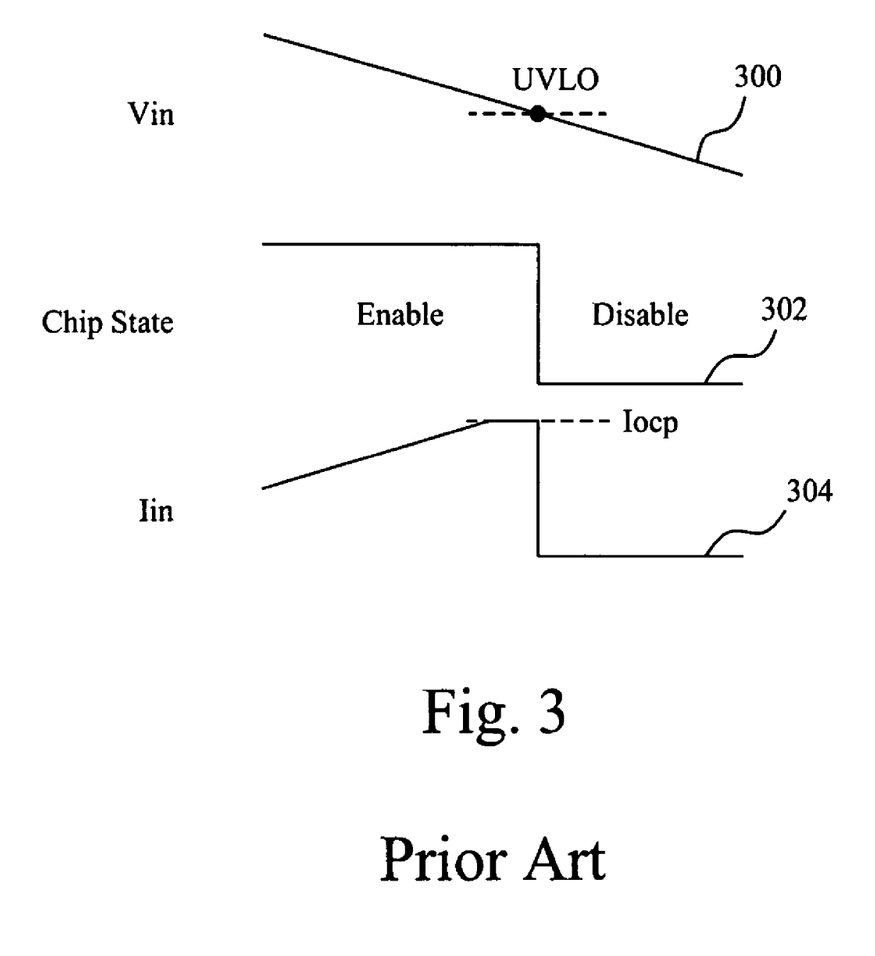
FIG. 3 shows the input voltage and the input current in the voltage regulators of FIGS. 1 and 2.

However, in a portable electronic product, the input voltage Vin is provided by a battery and gradually decreases with the duration of use. According to a principle that an input power shall be equal to an output power, it can be derived that $$Vin \times Iin = Vout \times Iout, \quad [Eq\text{-}1]$$

where Iout is the output current of the switching regulator 100 or the LDO regulator 200. Since the output voltage Vout and the output current Iout are designed to maintain at constant levels, as shown in FIG. 3, when the input voltage Vin decreases as indicated by the waveform 300, the input current Iin will increases in response thereto as indicated by the waveform 304. If the input voltage Vin decreases to be excessively low, the input current Iin will increase to reach the OCP threshold level $I_{OCP}$ and may trigger the over current protection accordingly. To a battery system, such situation will result in the input voltage Vin decreasing more steeply. When the input voltage Vin decreases to be lower than a undervoltage lockout threshold level UVLO, it means that the battery is no longer capable of providing sufficient voltage Vin, and thus the system will disable the controllers 104 and 204, as indicated by the waveform 302.

Figure 4:
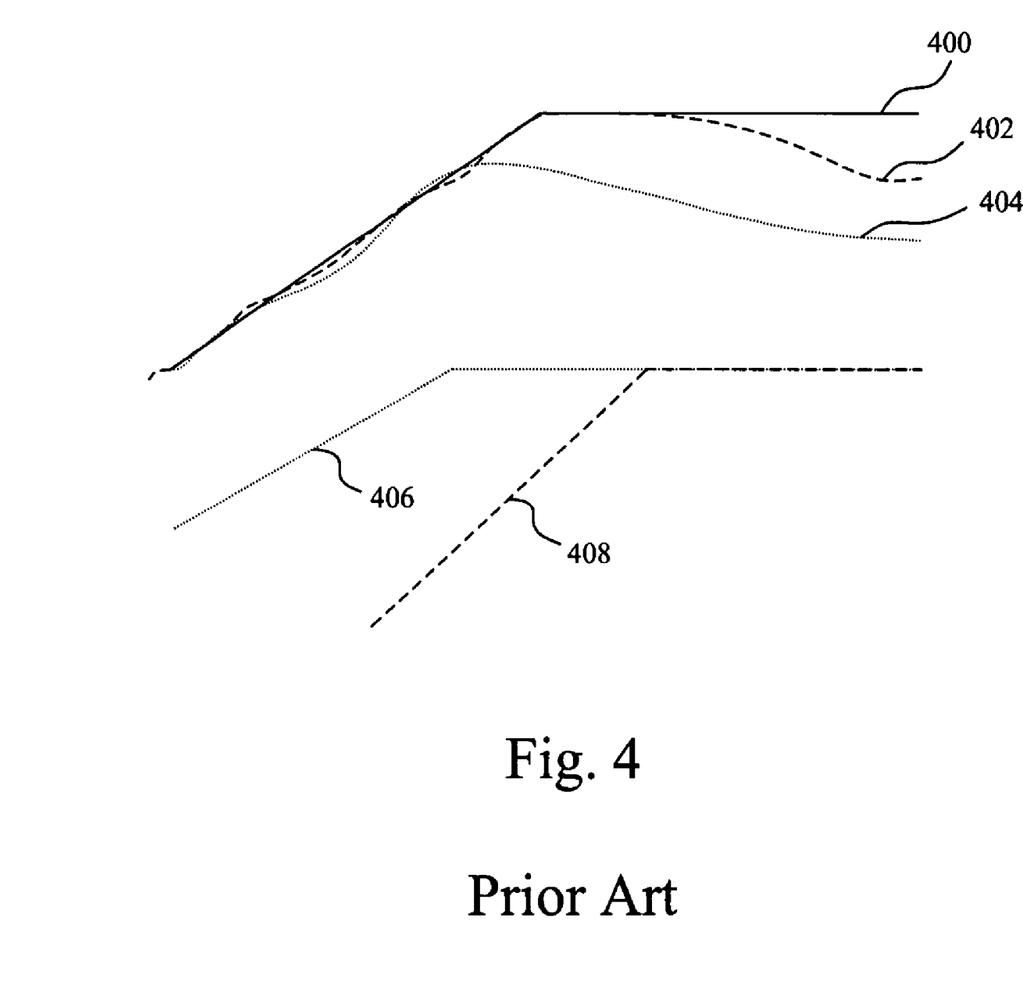
FIG. 4 depicts the output voltage vs. the input current in the switching regulator of FIG. 1 under different inductances of the inductor it employs.

In a photoflash capacitor charger with a part no. LD7266 provided by Leadtrend Technology Corporation, when the battery voltage is lower than a preset value, the duty cycle of the power switch will be adjusted to control the output current so as to extend the battery lifetime. However, such approach for controlling the output current is not suitable to voltage regulators because the feedback loop in a voltage regulator operates to control the feedback voltage VFB close to the reference voltage Vref. In normal operations, the input current Iin of a voltage regulator is not equal to the OCP threshold level $I_{OCP}$ and furthermore, in the switching regulator 100 of FIG. 1, if the inductance of the inductor L is changed, the input voltage Vin to trigger the over current protection will change correspondingly and this changes the slope of the output voltage Vout. FIG. 4 is a diagram showing the output voltage Vout vs. the input current Iin in the switching regulator 100 of FIG. 1 under different inductances of the inductor L, in which waveform 400 represents the threshold level $I_{OCP}$, waveform 402 represents the input current Iin when the inductance is LB, waveform 404 represents the input current Iin when the inductance is LA, waveform 406 represents the output voltage Vout when the inductance is LA, and waveform 408 represents the output voltage Vout when the inductance is LB, where LA>LB. As shown in FIG. 4, the performance of the output voltage Vout will be different if the switching regulator 100 employs different inductor L.

Therefore, it is desired a circuit and method for a voltage regulator for longer battery lifetime provided to the voltage regulator.

SUMMARY OF THE INVENTION

An object of the present invention is to provide a soft-stop circuit and method for a voltage regulator to extend the lifetime of the battery provided the input voltage for the voltage regulator.

According to the present invention, a soft-stop circuit and method for a voltage regulator which converts a battery voltage to an output voltage, monitor the battery voltage in order to control the voltage regulator to enter a soft-stop state if the battery voltage is lower than a threshold level. In the soft-stop state, the output voltage will be reduced such that the battery voltage will have a slower decreasing speed.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAIL DESCRIPTION OF THE INVENTION

Figure 5:
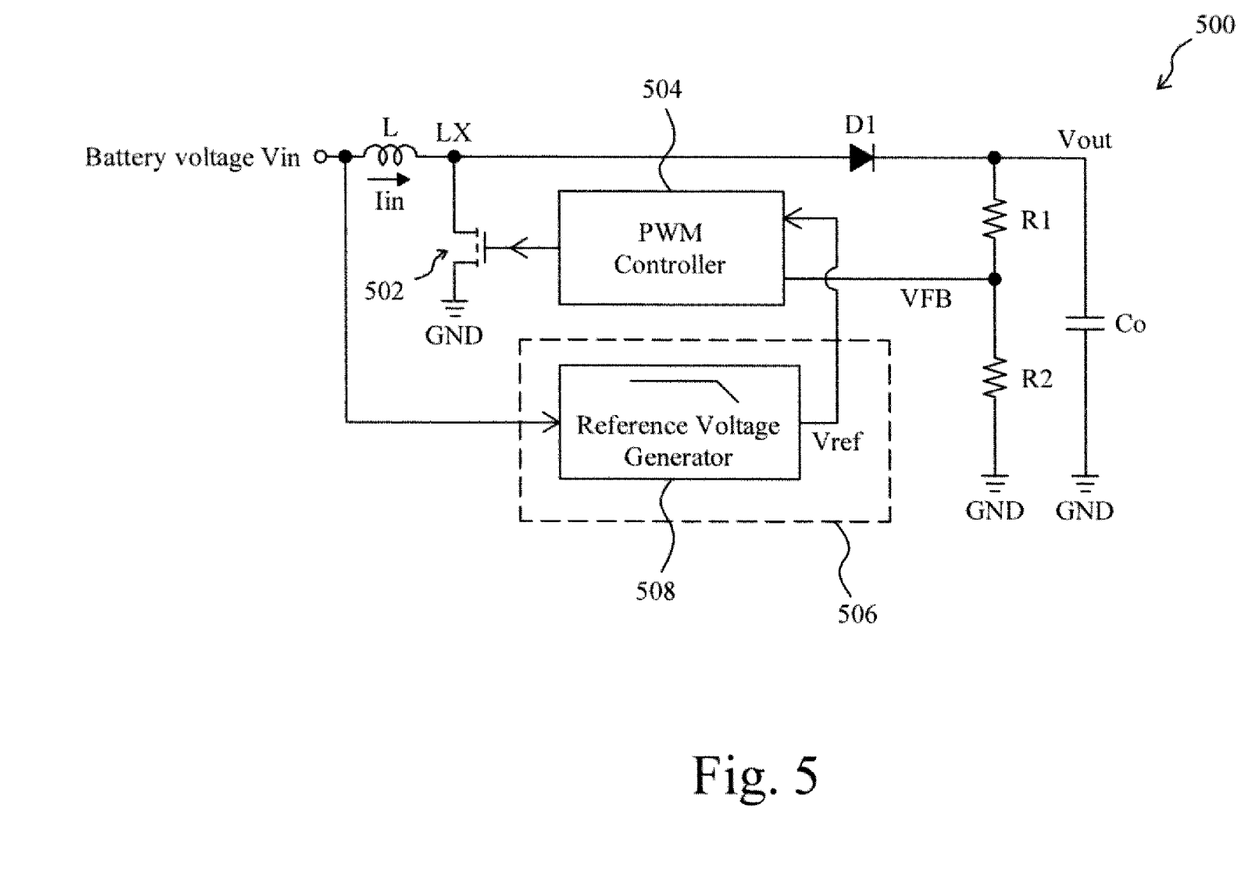
FIG. 5 shows a first embodiment according to the present invention.
Figure 6:
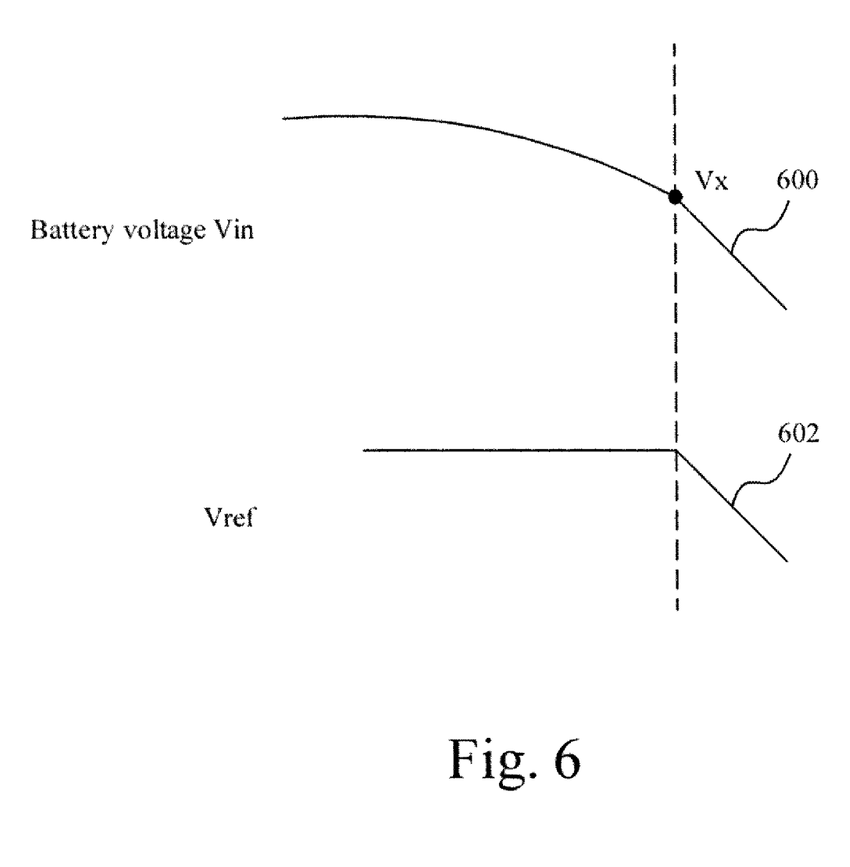
FIG. 6 is a diagram showing the battery voltage vs. the reference voltage in the switching regulator of FIG. 5.

FIG. 5 is a simplified circuit diagram of a first embodiment according to the present invention, in which a boost switching regulator 500 comprises an inductor L and a diode D1 serially connected between a power input receiving a battery voltage Vin and a power output providing an output voltage Vout, a PWM controller 504 to switch a switch 502 connected between a switch node LX and ground GND to convert the battery voltage Vin to the output voltage Vout, voltage divider resistors R1 and R2 serially connected between the power output Vout and ground GND for dividing the output voltage Vout to generate a feedback voltage VFB, and a soft-stop circuit 506 including a reference voltage generator 508 to provide a reference voltage Vref for the PWM controller. The reference voltage generator 508 monitors the battery voltage Vin and adjusts the reference voltage Vref accordingly, and the PWM controller 504 regulates the output voltage Vout according to the feedback voltage VFB and the reference voltage Vref. FIG. 6 is a diagram showing the battery voltage Vin vs. the reference voltage Vref in the switching regulator 500 of FIG. 5. When the battery voltage Vin is higher than a threshold level Vx, the reference voltage generator 508 operates to provide a constant reference voltage Vref as in a conventional switching regulator; while the battery voltage Vin is lower than the threshold level Vx, the soft-stop circuit 506 will control the switching regulator 500 to enter a soft-stop state, in which the reference voltage generator 508 provides a varying reference voltage Vref=a×Vx, where a is a constant. As shown by the waveform 602, in this embodiment, the reference voltage Vref linearly decreases after the battery voltage Vin is lower than the threshold level Vx. As those ones skilled in the art have known, the feedback voltage VFB will trace to the reference voltage Vref. Therefore, the feedback voltage VFB decreases together with the reference voltage Vref, which means that the output voltage Vout decreases as well. From the equation Eq-1, a decreasing output voltage Vout causes a decreasing input current Iin, which will slow down the decreasing speed of the battery voltage Vin and thereby extend the battery lifetime. Since this embodiment directly controls the output voltage Vout, the control is free from the effect of the changed inductance of the inductor L.

Figure 7:
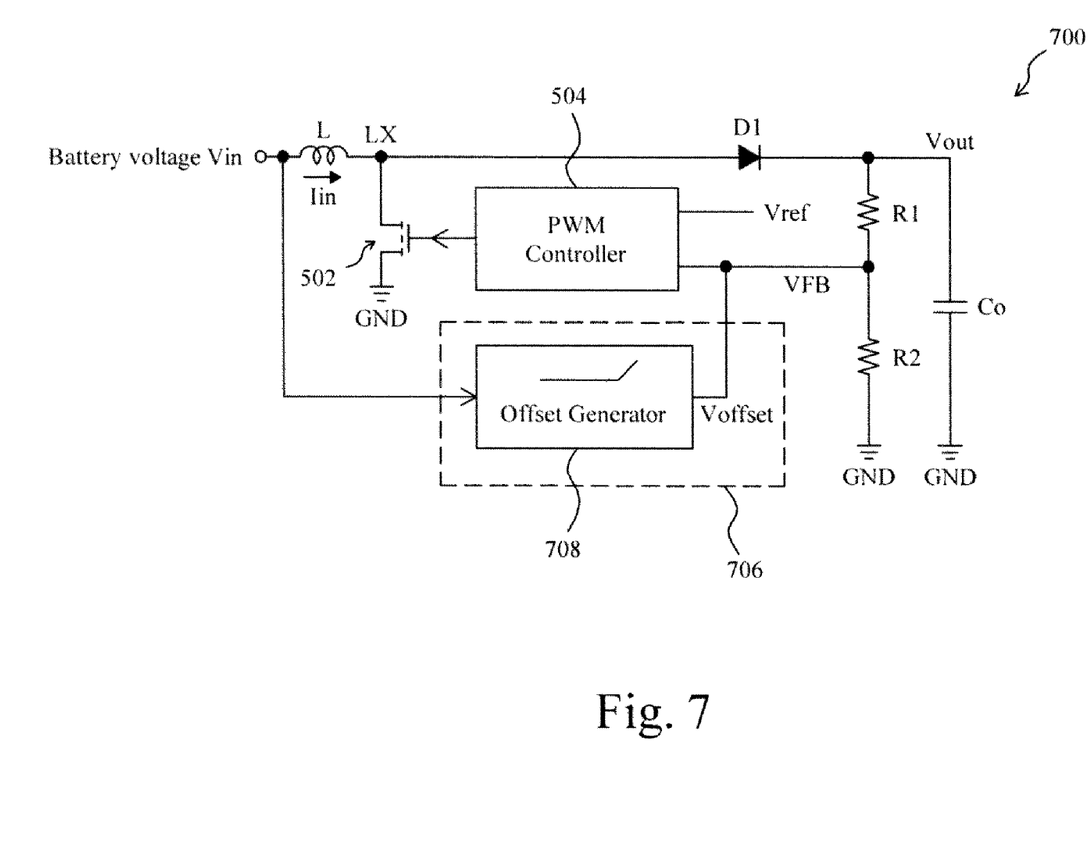
FIG. 7 shows a second embodiment according to the present invention.
Figure 8:
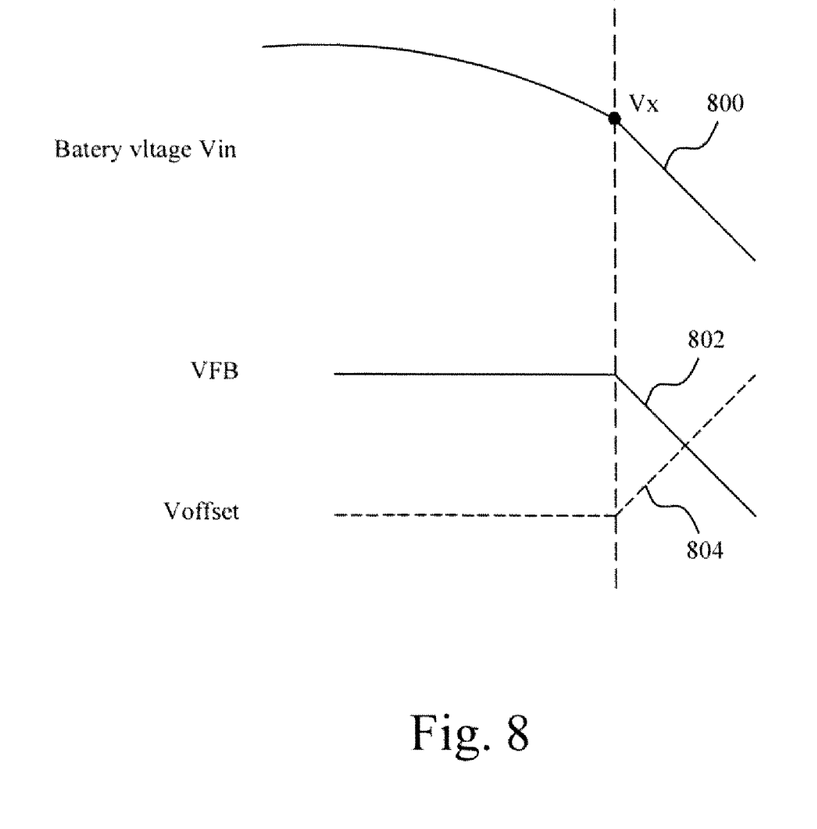
FIG. 8 is a diagram showing the battery voltage vs. the feedback voltage in the switching regulator of FIG. 7.

FIG. 7 shows a second embodiment according to the present invention, and FIG. 8 is a diagram showing the battery voltage Vin vs. the feedback voltage VFB in the boost switching regulator 700 of FIG. 7. In this embodiment, it is now the feedback voltage VFB to be modified. A soft-stop circuit 706 comprises an offset generator 708 for providing an offset voltage Voffset to modify the feedback voltage VFB according to the battery voltage Vin. As shown in FIG. 8, when the battery voltage Vin is higher than a threshold level Vx, the offset voltage Voffset is constant, and since Vref=VFB+Voffset in a switching regulator, the feedback voltage VFB is also constant. However, as indicated by the waveforms 802 and 804 in FIG. 8, after the battery voltage Vin is lower than the threshold level Vx such that the soft-stop circuit 706 controls the switching regulator 700 to enter a soft-stop state, the offset generator 708 provides a varying offset voltage Voffset=a×Vx, where a is a constant. As a result, as shown by the waveform 804 in FIG. 8, the offset voltage Voffset linearly increases, and the feedback voltage VFB decreases along with the increasing offset voltage Voffset, thereby reducing the output voltage Vout. Therefore, the input current Iin reduces so as to slow down the decreasing speed of the battery voltage Vin and thereby extend the battery lifetime.

Though the boost switching regulators are described for illustration in the above embodiments, the soft-stop circuit according to the present invention is also suitable to all other types of switching regulators.

Figure 9:
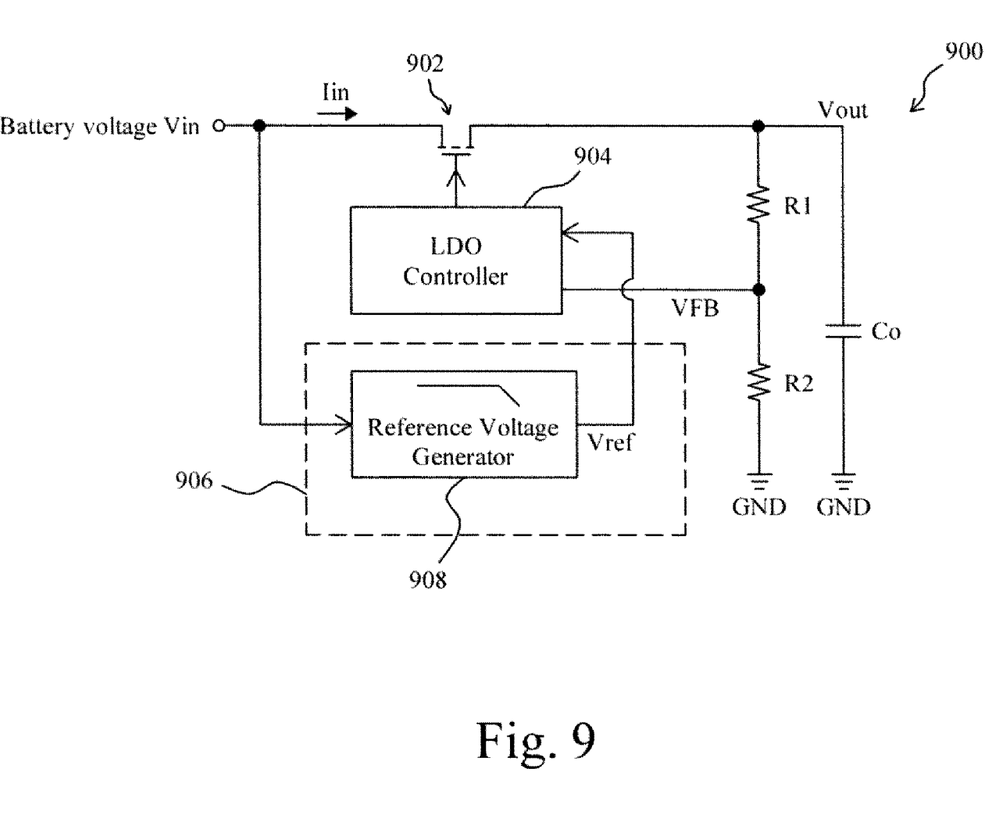
FIG. 9 shows a third embodiment according to the present invention.

FIG. 9 shows a third embodiment according to the present invention. In a LDO regulator 900, a switch 902 is connected between a power input receiving a battery voltage Vin and a power output providing an output voltage Vout, voltage divider resistors R1 and R2 are serially connected between the power output Vout and ground GND for dividing the output voltage Vout to generate a feedback voltage VFB, an LDO controller 904 controls the input current Iin flowing through the switch 902 according to the feedback voltage VFB and a reference voltage Vref so as to convert the battery voltage Vin to the output voltage Vout, and a soft-stop circuit 906 comprises a reference voltage generator 908 to provide the reference voltage Vref according to the battery voltage Vin. Referring to FIG. 6, when the battery voltage Vin is higher than a threshold level Vx, the reference voltage generator 908 provides a constant reference voltage Vref; while the battery voltage Vin is lower than the threshold value Vx, the soft-stop circuit 906 controls the LDO regulator 900 to enter a soft-stop state, in which the reference voltage Vref provided by the reference voltage generator 908 linearly decreases as shown by the waveform 602 in FIG. 6, thereby making the feedback voltage VFB and the output voltage Vout decrease correspondingly. According to the equation Eq-1, the input current Iin decreases with the decreasing output voltage Vout, so that the decreasing speed of the battery voltage Vin becomes slower and thereby the battery lifetime is extended.

Figure 10:
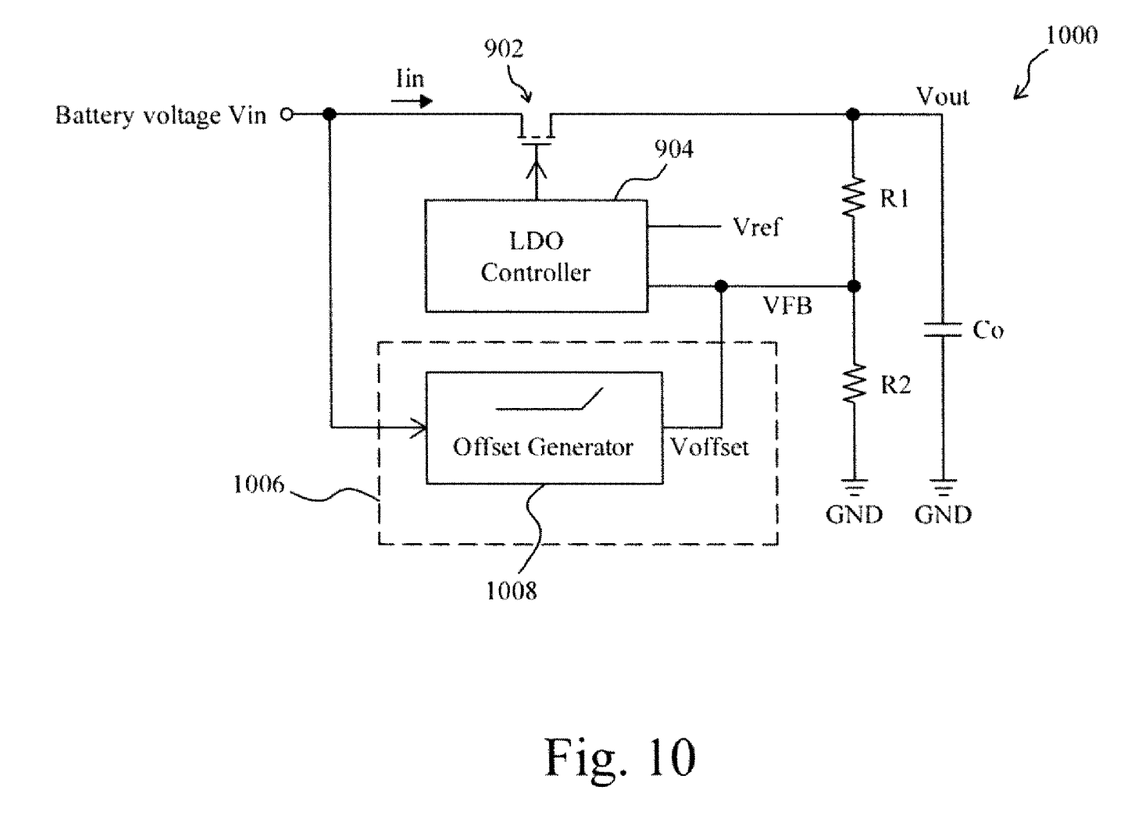
FIG. 10 shows a fourth embodiment according to the present invention.

FIG. 10 shows a fourth embodiment according to the present invention. In This LDO regulator 1000, it is now the feedback voltage VFB to be modified by a soft-stop circuit 1006 which comprises an offset generator 1008 to provide an offset voltage Voffset to modify the feedback voltage VFB according to the battery voltage Vin. Referring to FIG. 8, the offset generator 1008 provides a constant offset voltage Voffset when the battery voltage Vin is higher than a threshold level Vx, and a varying offset voltage Voffset after the battery voltage Vin becomes lower than the threshold level Vx. When the LDO regulator 1000 enters a soft-stop state, the offset voltage Voffset linearly increases as shown by the waveform 804 in FIG. 8, and the feedback voltage VFB and the output voltage Vout decreases correspondingly. According to the equation Eq-1, the input current Iin decreases with the decreasing output voltage Vout, so that the battery voltage Vin will have a slower decreasing speed and thereby the battery lifetime can be extended.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A soft-stop circuit for a voltage regulator which converts a battery voltage to an output voltage and includes a controller for regulating the output voltage according to a feedback voltage derived from the output voltage and a reference voltage, the soft-stop circuit characterized in that it controls the voltage regulator to enter a soft-stop state when the battery voltage is lower than a threshold level, and in the soft-stop state, the soft-stop circuit controls the output voltage to decrease the battery voltage discharge rate.

2. The soft-stop circuit of claim 1, comprising a reference voltage generator for monitoring the battery voltage and providing the reference voltage accordingly.

3. The soft-stop circuit of claim 2, wherein the reference voltage generator adjusts the reference voltage according to the battery voltage so as to decrease the output voltage in the soft-stop state.

4. The soft-stop circuit of claim 1, comprising an offset generator for monitoring the battery voltage and providing an offset voltage accordingly so as to modify the feedback voltage.

5. The soft-stop circuit of claim 4, wherein the offset generator controls the feedback voltage to decrease so as to decrease the output voltage in the soft-stop state.

6. A soft-stop method for a voltage regulator which converts a battery voltage to an output voltage and includes a controller for regulating the output voltage according to a feedback voltage derived from the output voltage and a reference voltage, the soft-stop method comprising the steps of:
    (a) monitoring the battery voltage;
    (b) controlling the voltage regulator to enter a soft-stop state when the battery voltage is lower than a threshold level; and
    (c) in the soft-stop state, controlling the output voltage to decrease the battery voltage discharge rate.

7. The soft-stop method of claim 6, wherein the step (c) comprises the step of adjusting the reference voltage according to the battery voltage so as to decrease the output voltage.

8. The soft-stop method of claim 6, wherein the step (c) comprises the step of adjusting the feedback voltage according to the battery voltage so as to decrease the output voltage.

* * * * *